United States Patent

[11] 3,628,453

[72] Inventors Robert C. Jackson
2450 Bending Willow Drive;
James C. Mueller, 650 Princewood Ave.,
both of Dayton, Ohio 45429; Edgar E.
Hardy, 3324 Sunnycrest Lane, Kettering,
Ohio 45419
[21] Appl. No. 886,825
[22] Filed Dec. 22, 1969
[45] Patented Dec. 21, 1971

[54] WORDPRINTER EDUCATIONAL AID
5 Claims, 8 Drawing Figs.
[52] U.S. Cl. .................................................. 101/111,
101/95, 101/93
[51] Int. Cl. ................................................. B41j 1/20
[50] Field of Search .......................................... 101/111,
113, 93 MA, 95, 94, 20, 97, 99, 100, 101; 197/133

[56] References Cited
UNITED STATES PATENTS
2,826,987   3/1958   Eckhoff .................... 101/111 X
3,280,730   10/1966  Churchill .................. 101/113 X
2,849,934   9/1958   Braun ...................... 101/95 X
2,950,048   8/1960   Luhn ....................... 101/111 UX
472,481     4/1892   Jackson .................... 101/111 X
758,425     4/1904   Davison .................... 101/20
1,137,103   4/1915   Winter ..................... 101/95
1,372,323   3/1921   Tiefel ..................... 101/20
3,057,291   10/1962  Smith ...................... 101/95 X
3,370,531   2/1968   Falk ....................... 101/95
3,467,006   9/1969   Johnson .................... 101/95
1,960,560   5/1934   Todd ....................... 101/97
3,331,315   7/1967   Henry ...................... 101/97 X Primary Examiner—Robert E. Pulfrey
Assistant Examiner—E. M. Coven
Attorneys—William R. Jacox and L. Bruce Stevens, Jr.

ABSTRACT: Printer apparatus which is particularly adapted for use as an educational device for teaching children words or the alphabet. A plurality of annular belts or the like are retained in side-by-side relationship, and each belt is individually rotatively movable. Each belt carries a series of character elements on one of the surfaces thereof and a similar series of character elements on an opposite surface thereof. The series off character elements on the opposed surfaces of the belt are arranged so that when a given character element on one surface of the belt is positioned at a print position, a similar character element on the opposed surface of the belt is positioned at a view position. Print receiver material, such as paper or the like, has a portion disposed adjacent the belts to receive print thereupon from the character elements thereof by engagement therewith.

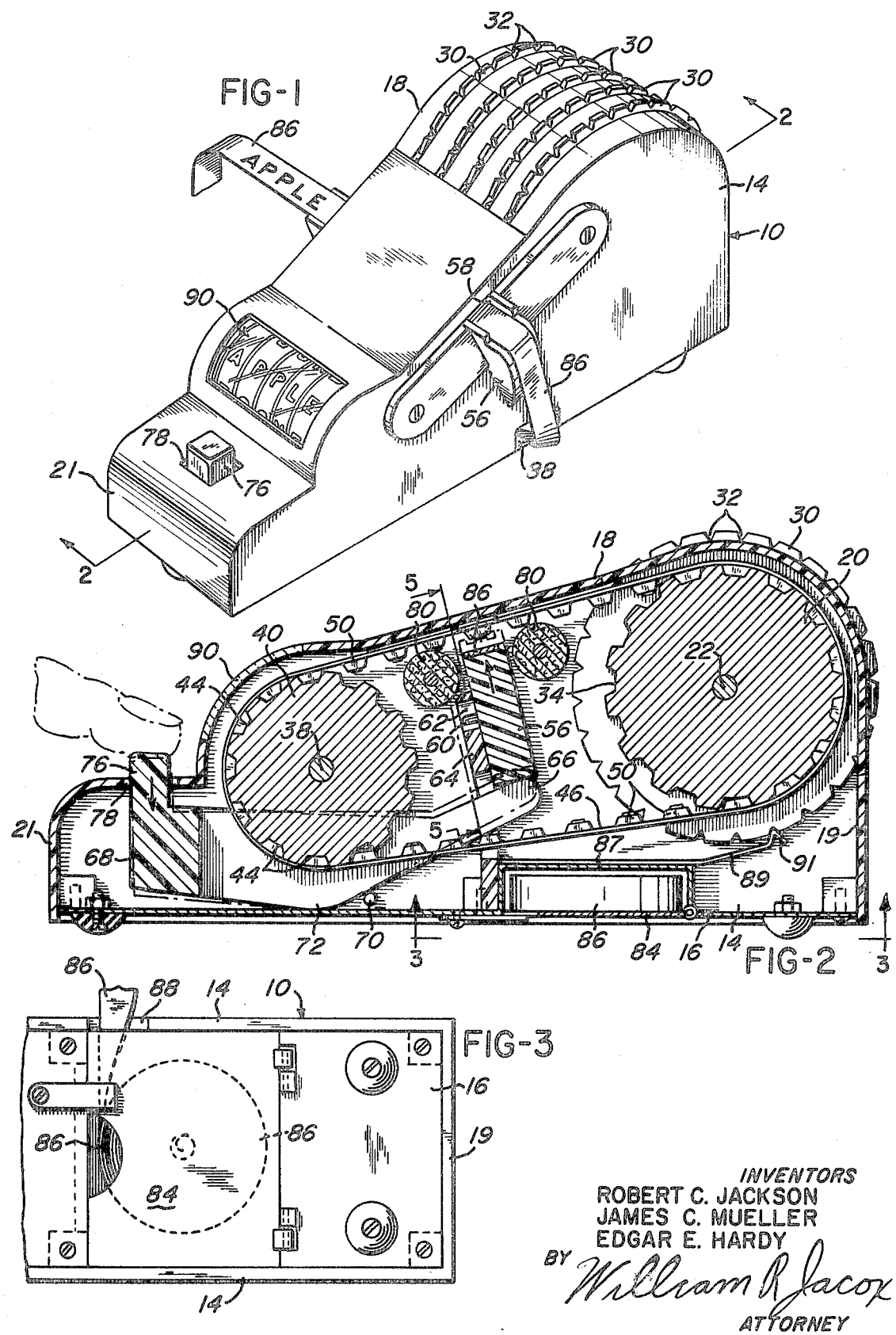

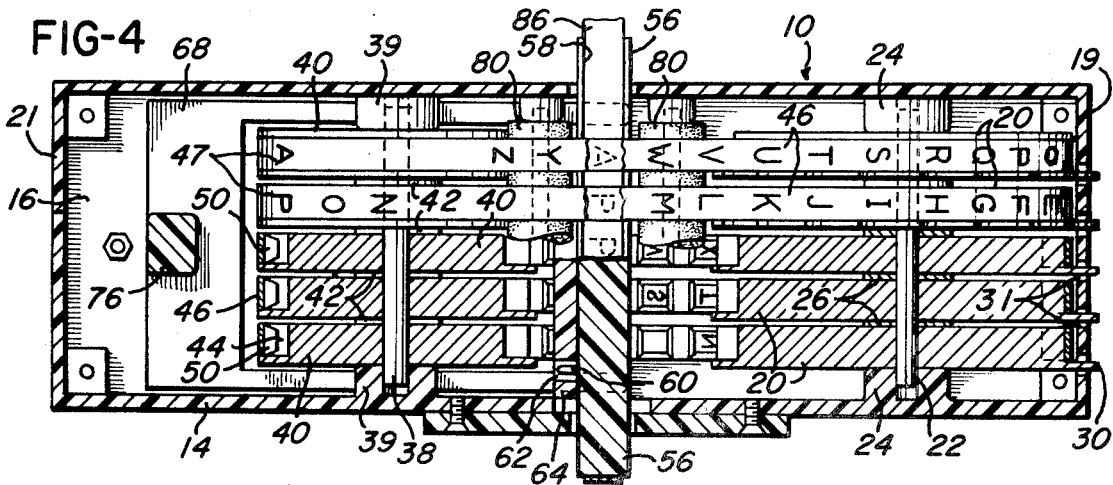
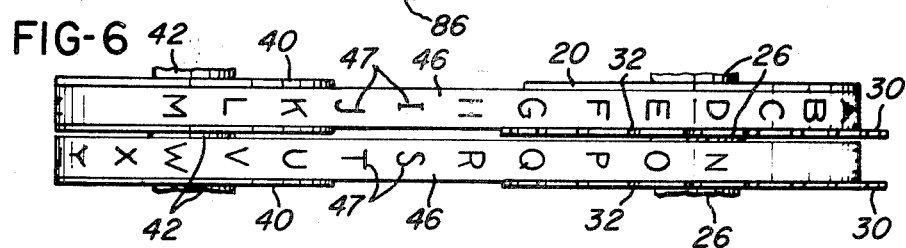
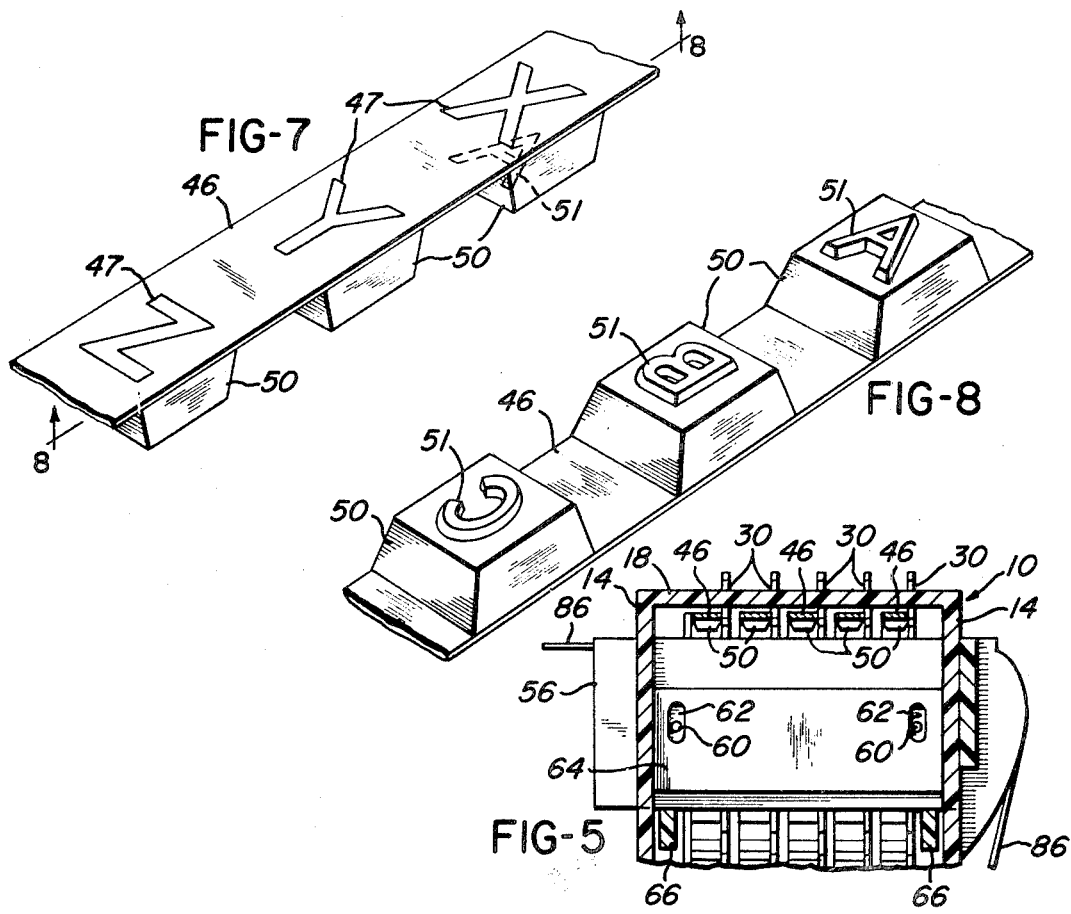

WORDPRINTER EDUCATIONAL AID

BACKGROUND OF THE INVENTION

The fact is well known that children enjoy manual manipulation of devices as they play and as they learn.

It is an object of this invention to provide word printer apparatus which can be easily manually operated by a child as an educational device in assisting the child in learning to identify words or letters of the alphabet or the like.

It is another object of this invention to provide low cost printer apparatus which may have several types of uses.

Other objects and advantages reside in the construction of parts, the combination thereof, the method of manufacture, and the mode of operation as will become more apparent from the following description.

SUMMARY OF THE INVENTION

A plurality of rotatable annular belts are arranged in side-by-side relationship. Each belt carries character elements on each of two opposed surfaces thereof. The character elements on one surface are for printing and the character elements on the opposite surface are for observation. Means are provided for causing relative movement between printer receiver means and the print character elements of the belt for performing a print operation.

BRIEF DESCRIPTION OF THE DRAWINGS

FIG. 1 is a perspective view of word printer educational aid apparatus of this invention.

FIG. 2 is an enlarged sectional view taken substantially on line 2—2 of FIG. 1.

FIG. 3 is a fragmentary bottom view taken substantially on line 3—3 of FIG. 2.

FIG. 4 is a fragmentary sectional view, with parts broken away, taken substantially on line 4—4 of FIG. 2.

FIG. 5 is a sectional view, taken substantially on line 5—5 of FIG. 2.

FIG. 6 is a top view of a portion of the apparatus of this invention, as the apparatus is seen in FIG. 4, but in another operative position.

FIG. 7 is a fragmentary perspective view, drawn on a larger scale than the other figures, of a portion of an element of the apparatus of this invention.

FIG. 8 is a fragmentary perspective view, taken substantially on line 8—8 of FIG. 7.

DETAILED DESCRIPTION OF THE PREFERRED EMBODIMENT

The apparatus of this invention comprises a housing 10 provided with side portions 14, a bottom or floor portion 16, a top portion 18, a back portion 19, and a front portion 21.

A group of coaxial drive wheels 20 are rotatable upon a shaft 22 which is supported by the side portions 14. Each of the drive wheels 20 is individually rotatable upon the shaft 22. The ends of the shaft 22 are mounted in bushings 24 which may be integral with or otherwise attached to the side portions 14. The drive wheels 20 are separated by spacers 26. Each drive wheel 20 has a disk 30 which may be integral therewith and has a part extending from the top portion 18 and back portion 19 of the housing 10, through slots 31 of the housing 10, as shown in FIGS. 1, 2, and 4. Each disk 30 is shown as having notches 32 therein adjacent the periphery thereof. Each drive wheel 20 has spaced-apart recesses 34 in the periphery thereof, as shown in FIG. 2.

Also, extending between the side portions 14 is a shaft 38, the ends of which are supported by bushings 39, which may be integral with or otherwise attached to the side portions 14, as shown in FIG. 2.

Rotatably supported upon the shaft 38 are a group of follower wheels 40 which are separated by spacers 42. Each follower wheel 40 has spaced-apart recesses 44 at the periphery thereof, as illustrated in FIG. 2. The number of follower wheels 40 is equal to the number of drive wheels 20, so that there is one follower wheel 40 for each drive wheel 20.

Encompassing each drive wheel 20 and its respective follower wheel 40 is a belt 46. Each belt 46 may carry any suitable indicia as character elements. Herein each belt 46 is shown as having an outer surface which is provided with character elements 47 in the form of letters of the alphabet arranged alphabetically in series relationship thereupon on the upper surface thereof.

Each belt 46 also has an inner surface which carries spaced-apart lugs 50. The portions of the belts 46 which are in engagement with the wheels 20 and 40 have the lugs 50 thereof disposed within the recesses 34 of the wheels 20 and within the recesses 44 of the wheels 40, as shown in FIG. 2. Each lug 50 has attached thereto, integrally or otherwise, a character element 51, such as a letter of the alphabet, as shown in FIG. 8.

As each belt 46 encompasses the wheels 20 and 40, the belt 46 has an upper part adjacent the top portion 18 of the housing 10 and a lower part spaced from the bottom portion 16 of the housing 10, as shown in FIG. 2.

Positioned between the upper part and the lower part of the belts 46 and between the wheels 20 and 40 is a carriage 56, the upper part of which is provided with a channel 58. The carriage 56 extends between the side portions 14 of the housing 10 and also extends therefrom. Between the side portions 14, the carriage 56 has pins 60 extending therefrom. The pins 60 are within guide slots 62 of a stationary member 64, which is also within the housing 10 between the side portions 14 thereof, as shown in FIGS. 2, 4, and 5.

The carriage 56 rests upon arm members 66 which extend from a base 68, which is positioned adjacent the front portion 21 of the housing 10 and between the side portions 14 thereof.

Each arm 66 normally engages a stud 70, shown in FIG. 2, which is attached to one or both of the side portions 14. Each arm 66 has a rocker part 72 which rests upon the bottom portion or floor 16 of the housing 10, as shown in FIG. 2. The base 68 has a protuberance 76 which extends upwardly therefrom through an opening 78 in the top portion 18 of the housing 10, adjacent the front portion 21 thereof.

A pair of ink rollers 80 are rotatably disposed adjacent the carriage 56, there being one ink roller 80 on each side of the carriage 56 and extending between the side portions 14, as shown in FIGS. 2 and 4.

A door 84 is hingedly attached to the bottom portion 16 of the housing 10. The door 84 supports within the housing 10 a roll of print receiver strip material 86, such as a strip of paper or the like. As the strip material 86 rests upon the door 84, a portion thereof extends outwardly from the housing 10 through an opening 88, shown in FIG. 1. The strip material 86 then extends upwardly and into the channel 58 at the upper surface of the carriage 56 and extends across the carriage 56.

Within the housing 10 and partially enclosing the strip material 86 is a wall 87 to which is attached a plurality of leaf springs 89, there being one leaf spring 89 adjacent each of the drive wheels 20. Each leaf spring 89 has a V-shaped end portion 91 which is adapted to move into one of the notches 32 of the disk 30 of its respective drive wheel 20, to retain the rotative position thereof.

The housing 10 has a window 90 therein, through which a portion of the outer surface of each of the belts 46 may be observed.

OPERATION

Each letter 51 which is in printing position adjacent the 56 also appears as a character element 47 at a view position or observation position adjacent the window 90 and may be observed therethrough, as illustrated in FIG. 1. FIG. 1 illustrates printing of the word "APPLE." In order to print this word, the first belt 46 is rotated until the letter "A" which is carried on the upper surface of the belt 46 may be seen through the window 90. When the belt 46 is rotatively positioned so that the letter "A" on the upper surface thereof is seen through the window 90, the lug 50 which carried the letter "A" on the lower surface of the belt 46 is positioned directly above the carriage 56. Likewise, when the second and third belts 46 are rotatively moved so that the letter "P" on the upper surface thereof appears through the window 90, the lug 50 which carries the letter "P" on the lower surface of each of the second and third belts is positioned directly above the carriage 56. The fourth belt 46 is rotatively moved to position the letter "L" at the window 90, and the fifth belt 46 is rotatively moved to position the letter "E" at the window 90. Thus, the lug 50 which carries the letter "L" on the lower surface of the fourth belt and the lug 50 which carries the letter "E" on the lower surface of the fifth belt are positioned directly above the carriage 56.

Each belt 46 is rotatively moved by manually engaging the disk 30 of the wheel 20 which is encompassed by the belt 46. As the wheel 20 is rotated, the V-shaped end portion 91 of the respective leaf spring 89 moves into successive notches 32 of the disk 30. When each wheel 20 is rotatively positioned as desired, each leaf spring 89 retains the rotative position of its respective drive wheel 20.

As shown in FIGS. 4 and 6, the series of character elements 47 and 51 on each belt 46 may be arranged so that a greater space exists between letters such as between "M" and "N" and between "Z" and "A" so that all of the belts do not need to be used with each print operation. Thus, a short word or a plurality of words with spaces therebetween may be printed in a given print operation.

Each belt 46 is rotatively moved by manually engaging the disk 30 which is attached to the drive wheel 20 which is encompassed by the belt 46. Due to the fact that the lugs 50 of each belt 46 move into the recesses 34 of the drive wheel 20 which is engagingly encompassed thereby, the drive wheel 20 readily rotatively moves the belt 46 which is in engagement therewith. When each belt 46 rotatively moves, the belt 46 also causes rotative movement of the follower wheel 40 which is engaged by the belt 46, as the lugs 50 of the belt 46 move into the recess 44 of the follower wheel 40.

As each belt 46 is rotatively moved, each lug 50, on the lower surface thereof, engages one of the ink rollers 80 as the lug 50 approaches the carriage 56. Therefore, as each lug 50 is moved to the position directly above the carriage 56, the letter or character element 51 which is carried thereby engages one of the ink rollers 80 and is inked thereby.

After the belts 46 are rotatively moved so that a desired word, such as the word "APPLE," appears at the window 90, the protuberance 76 of the base 68 adjacent the front portion 21 of the housing 10, is pushed downwardly, as illustrated by broken lines in FIG. 2. When the protuberance 76 is pushed downwardly, the arms 66 are rocked on their rocker parts 72, as illustrated by broken lines in FIG. 2, and the arms 66 force the carriage 56 upwardly. As the carriage 56 moves upwardly the strip material 86 within the channel 58 is moved upwardly by the carriage 56 and into engagement with the character elements 51 which are carried by the lugs 50 which are disposed directly above the carriage 56. Thus, the word "APPLE" is printed on the upper surface of the portion of the strip material 86 which is within the channel 58. After pressure upon the protuberance 76 is released, the arms 66 are permitted to rock back to their normal positions, in engagement with the studs 70, as shown in solid lines in FIG. 2, and the carriage 56 is returned by gravity to its normal position shown in solid lines in FIG. 2. The end of the strip material 86 at the left-hand portion of the housing 10, as shown in FIG. 1, may be grasped and pulled outwardly from the housing 10, as illustrated in FIG. 1. Thus, the printed word which has been printed upon the strip material 86 may be observed at the side of the housing 10, as shown in FIG. 1. The portion of the strip 86 adjacent the housing 10 upon which the letters have been printed may be removed from the remainder of the strip 86, if desired, by severance of the strip. However, if desired, the next word may be printed upon the strip 86 without severance thereof.

The next desired word or group of words are printed by rotatively moving the respective disks 30 until the desired word appears in the window 90. Then the protuberance 76 is again pushed downwardly, to rock the arms 66 and to force the carriage 56 upwardly into engagement with the character elements 51 which are carried by the lugs 50 which are immediately above the carriage 56.

It is to be understood that printer apparatus of this invention is not limited to the printing of letters of an alphabet or the like. The belt members of apparatus of this invention may carry numerals, symbols, or other types of character elements for printing thereof.

It is also to be understood that inking means, such as the ink rollers 80 or the like, may not be necessary. An ink ribbon or the like may be positioned between the strip 86 and the character elements 51. As another modification, the strip 86 or other print receiver means may comprise pressure sensitive paper or the like, such as disclosed and claimed in U.S. Pat. No. Re. 24,899, or 2,730,457, or 2,712,507, for example, or any other pressure sensitive material which provides printed indicia on the material as a result of pressure applied between a character element and the material.

Although the preferred embodiment of the device has been described, it will be understood that within the purview of this invention various changes may be made in the form, details, and mode of operation, which generally stated consist in a device capable of carrying out the objects set forth, as disclosed and defined in the appended claims.

The invention having thus been described, the following is claimed:

1. As an educational aid, printer apparatus comprising:
   support structure, the support structure having a print position and an observation position, the print position being in spaced relationship from the observation position,
   a plurality of parallel annular belt members rotatably supported by the support structure, each belt member having a portion adjacent the print position and a portion adjacent the observation position of the support structure, each belt member having a first surface provided with a series of character print elements and an opposite surface provided with a corresponding series of character observation elements, the character print elements and the character observation elements being in spaced-apart relationship along the belt member and so arranged with respect to the belt member that when a given character print element is positioned adjacent the print position of the support structure a corresponding character observation element is positioned adjacent the observation position of the support structure,
   ink means adjacent the print position at opposite sides thereof and engageable by the character print elements of each belt member for inking thereof as the belt member is rotatably moved and as the character print elements move to the print position,
   carriage means adjacent the print position of the support structure,
   print receiver material supported by the carriage means and movable thereby into engagement with a character print element which is adjacent the print position of the support structure for printing the character upon the print receiver material,
   the character which is printed upon the print receiver material at the print position of the support structure thus being the same character which appears upon the belt member adjacent the observation position of the support structure.

2. The means, of claim 1 in which the print receiver material is in the form of an elongate strip, there being a coil of the material supported by the support structure with a portion of the strip extending from the coil to the carriage means, the print receiver material extending across the carriage means in a direction substantially normal to the belt members.

3. The apparatus of claim 1 in which each belt has an inner surface provided with a plurality of spaced-apart lugs, there being one character print element carried by each of the lugs, the apparatus including a drive wheel and a driven wheel rotatably carried by the support structure for each belt member and in supporting relationship thereto, the drive wheel and the driven wheel being in spaced-apart relationship and rotatable about substantially parallel axes, the belt member engagingly encompassing the drive wheel and the driven wheel, the drive wheel and the driven wheel having a plurality of spaced-apart recesses which receive the lugs of the belt member, rotative movement of the drive wheel thus causing rotative movement of the belt member and rotative movement of the driven wheel.

4. The apparatus of claim 1 in which the support structure includes a bottom member, an arm member having a rocker portion which rests upon the bottom member, the arm member having an end portion engageable with the carriage means for movement thereof, the arm member having a protuberant portion adjacent an opposite end portion thereof, the protuberant portion being manually engageable for rocking pivotal movement of the arm member as the arm member rocks upon the bottom portion and urges movement of the carriage means.

5. Word printer educational aid apparatus comprising: support structure including a bottom portion and side portions, a plurality of axially aligned first wheels rotatably disposed between opposed side portions, each first wheel being rotatable with respect to each other first wheel, a plurality of axially aligned second wheels rotatably disposed between the side portions, each second wheel being rotatable with respect to each other second wheel, the axis of rotation of the first wheels and the axis of rotation of the second wheels being spaced apart and substantially parallel, a plurality of annular belt members, there being one belt member for each first wheel and each second wheel and in encompassing engaging relationship therewith so that the belt member and its respective wheels are rotatable together, each belt member having an outer surface provided with a series of character elements, each belt member having an inner surface provided with a similar series of character elements, carriage means adjacent the inner surface of the belt members and disposed between the first wheels and the second wheels, print receiver means supported by the carriage means adjacent the inner surface of the belt members and extending substantially normal to the belt members, the series of characters on the inner surface of each belt member being arranged with respect to the series of characters on the outer surface thereof so that a character on the inner surface of a belt member which is adjacent the carriage means also appears on the outer surface of the belt member at a location spaced from the carriage means, operator means for relative movement between the carriage means and a portion of the belt members, for engagement between the print receiver means and a character element on the inner surface of at least one belt member, ink means within the confines of the annular belt members, the ink means being adjacent the carriage means and disposed at opposed portions thereof, the ink means being engageable by the character elements on the inner surface of the belt members as the belt members are rotatively moved and move the character elements toward the carriage means.

\* \* \* \* \*